UNITED STATES PATENT OFFICE.

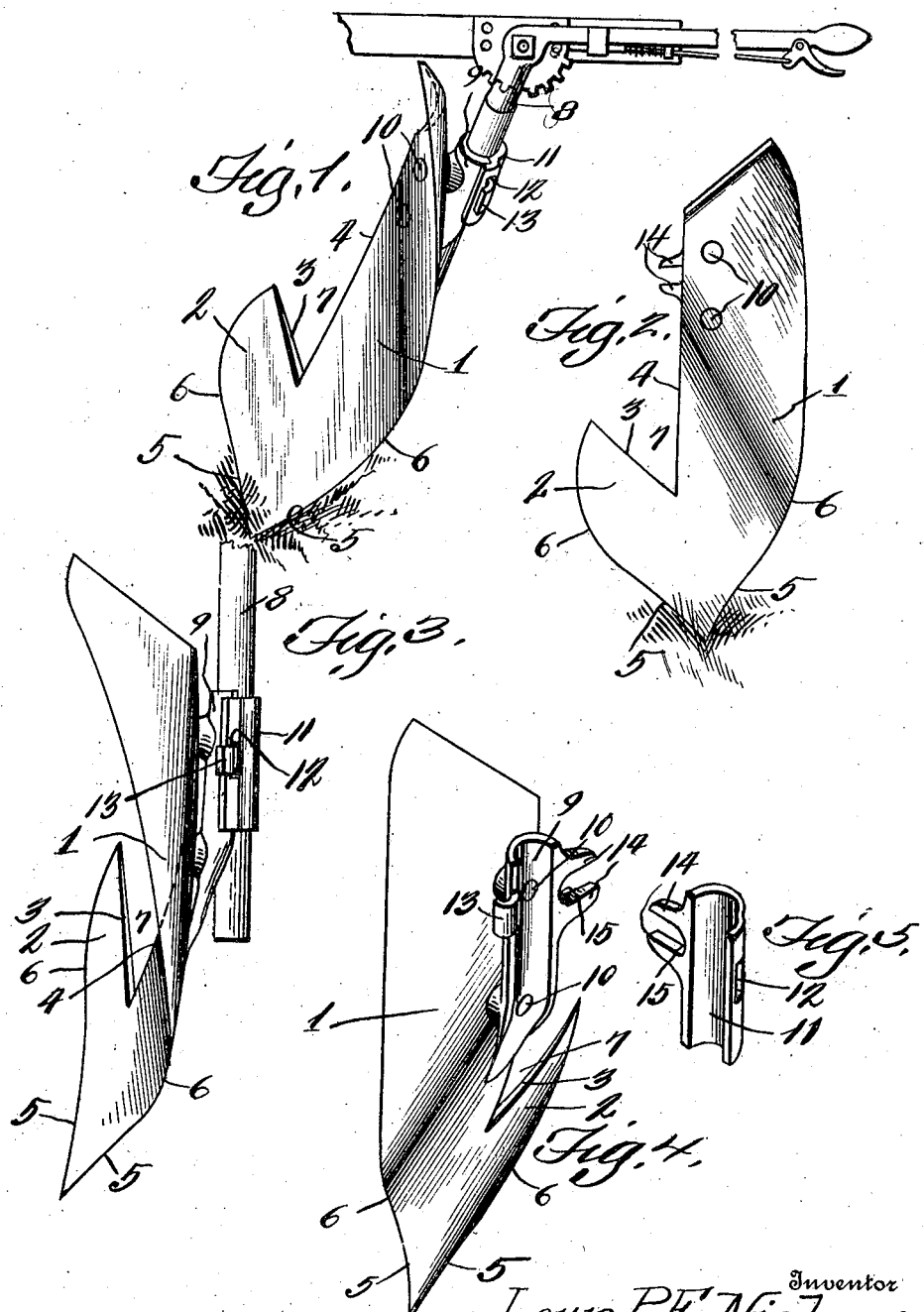

LOUIS P. F. NIELSEN, OF MARQUETTE, NEBRASKA.

CULTIVATOR-SHOVEL.

1,217,983. Specification of Letters Patent. Patented Mar. 6, 1917.

Application filed August 31, 1916. Serial No. 117,890.

*To all whom it may concern:*

Be it known that I, LOUIS P. F. NIELSEN, a citizen of the United States, residing at Marquette, in the county of Hamilton, State of Nebraska, have invented a new and useful Cultivator-Shovel; and I do hereby declare the following to be a full, clear, and exact description of the invention, such as will enable others skilled in the art to which is appertains to make and use the same.

This invention relates to the art of cultivators, and particularly to an improved cultivating shovel, and an object of the invention is to provide a device of this kind designed for cultivating small young corn crops.

A further object of the invention is to provide a shovel of this kind adapted, when plowing corn, to root the dirt around the corn crops, without covering the young crop.

A further object of the invention is to provide a shovel blade of this kind having a sharp V-shaped point and provided with a laterally extending side wing the upper edge of which is disposed at an acute angle to a substantially vertical edge of the body of the blade, thereby forming a V-shaped recess or opening in the blade upwardly and to one side of the V-shaped point, so that the earth or dirt, as the V-shaped portion of the blade passes through the earth, will follow upon the face of the blade and pass through the recess or opening. The body of the blade is curved, as shown, and the plane of the curve is at a slight angle to the obtuse angle of the lateral wing, which assists or tends to turn the earth through the recess.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in perspective of the improved cultivator shovel constructed in accordance with the invention.

Fig. 2 is a view in front elevation of the shovel.

Fig. 3 is a view in perspective of the shovel at a slightly different angle to that shown in Fig. 1, showing part of the rear face and part of the front face.

Fig. 4 is a perspective view of the shovel showing most of the rear face.

Fig. 5 is a detail perspective view of a clamp plate to coöperate with another clamp plate on the rear face of the shovel, to hold the shovel on a standard of a plow.

Referring more especially to the drawings, 1 designates the body of the blade, which is preferably elongated, and 2 denotes a lateral wing, the edge 3 of which is at an acute angle to the substantially straight edge 4 of the body of the blade. The shovel or blade has a substantially V-shaped rooting or gouging point, the cutting edges 5 of which are slightly concaved as shown, and which concaved cutting edges merge into the convexed cutting edges 6. The body of the shovel or blade is curved as shown, and the plane of the curvature is at a slight angle to the edge 3 of the lateral wing. The shovel when passing through the earth causes the dirt to ride upwardly upon the shovel and pass through the V-shaped recess or opening 7 to one side of the body of the shovel, the plane of the curvature of the body of the blades tending to turn the dirt laterally and through said recess or opening 7.

Moreover, the supporting standard 8 may be turned or adjusted in any suitable manner, so that the cutting edge 6 of the body of the blade may be closer to the ground. Moreover, the standard or shank 8 may be manipulated by hand operation, so that the shovel may assume various positions, which together with the other methods above set forth, the dirt or earth around small young corn crops may be rooted and thoroughly agitated. In other words, by means of the shovel, the dirt around small corn crops may be thoroughly broken, stirred or rooted around the corn, without covering the crop. A clamp 9 semi-circular in cross section is secured by rivets 10 on the rear face of the shovel. This clamp is coöperated with by another clamp 11, semi-circular in cross section, to fasten the shovel to the shank 8. This clamp 11 near one edge has a slot 12 to receive the curved tongue 13 on one edge of the clamp 9. The opposite edge portions of the clamps 9 and 11 are provided with forks 14, in the registering crotches 15 of which a bolt, not shown, may be arranged to hold the clamps in place upon the shank 8.

The invention having been set forth, what is claimed as new and useful, is:—

A cultivator shovel comprising a body of elongated shape having substantially parallel opposite edges, which in front elevation extends substantially vertically, said body at its lower portion terminating in a V-shaped point and provided with a lateral wing extending upwardly and rearwardly and laterally and having an upper edge extending at an acute angle to one of the edges of the body, thereby forming a V-shaped recess, said lower V-shaped point of the shovel having concaved cutting edges merging into convexed cutting edges of the wing and one of the edges of the body, said body being curved on a plane at a slight acute angle to the upper edge of the wing, thereby tending to turn or throw the dirt through said recess.

In testimony whereof I have signed my name to this specification in the presence of two subscribing witnesses.

LOUIS P. F. NIELSEN.

Witnesses:
PEARL SHANEYFELT,
HENRY C. PETERSEN.